United States Patent [19]

Izumi et al.

[11] Patent Number: 5,033,783
[45] Date of Patent: Jul. 23, 1991

[54] PARTS MOUNTING APPARATUS

[75] Inventors: Yasuo Izumi, Ikoma; Kazumi Ishimoto, Katano; Yutaka Makino, Kobe, all of Japan

[73] Assignee: Matsushita Electric Industrial Co., Ltd., Osaka, Japan

[21] Appl. No.: 424,367

[22] Filed: Oct. 19, 1989

[30] Foreign Application Priority Data

Oct. 20, 1988 [JP] Japan .................. 63-264507

[51] Int. Cl.[5] .................. B25J 15/06; B25J 19/02
[52] U.S. Cl. .................. 294/64.1; 294/907; 901/40; 901/47; 29/743; 414/737
[58] Field of Search .............. 294/64.1, 65, 907, 2; 901/40, 46, 47; 29/743; 414/730, 737, 121; 604/187

[56] References Cited

U.S. PATENT DOCUMENTS

| | | | |
|---|---|---|---|
| 2,956,769 | 10/1960 | Sigler et al. | 294/64.1 X |
| 3,608,946 | 9/1971 | Erickson et al. | 294/64.1 |
| 4,091,945 | 5/1978 | Patterson | 294/64.1 X |
| 4,122,836 | 10/1978 | Burnett | 604/187 X |
| 4,399,711 | 8/1983 | Klein | 901/47 X |
| 4,652,204 | 3/1987 | Arnett | 901/47 X |
| 4,752,682 | 6/1988 | Beck et al. | 091/47 X |

Primary Examiner—Margaret A. Focarino
Assistant Examiner—Dean J. Kramer
Attorney, Agent, or Firm—Wenderoth, Lind & Ponack

[57] ABSTRACT

A parts mounting apparatus which picks up a part by using a suction nozzle provided in a mounting head and transports the part so as to mount the part at a predetermined position, has: a suction nozzle portion including a suction nozzle, a light transmitting plate and a suction cylinder assembled such that the suction nozzle, the light transmitting plate and the suction cylinder define a suction chamber; the suction nozzle is made of light transmitting material; the light transmitting plate is spaced a proper distance from the suction nozzle; and the suction nozzle, the light transmitting plate and the suction cylinder connected integrally with each other.

5 Claims, 4 Drawing Sheets

5,033,783

PARTS MOUNTING APPARATUS

BACKGROUND OF THE INVENTION

The present invention generally relates to parts mounting apparatuses used for mounting electronic parts on a circuit board through suction on the electronic parts, etc. and more particularly, to a parts mounting apparatus having a suction nozzle made of transparent material.

Conventionally, as shown in FIG. 1, in order to mount electronic parts on a circuit board, an electronic part P to be mounted is sucked by a suction nozzle 51 at a parts feeding position 52 and then, the suction nozzle 51 is displaced to a recognition the position where position of the electronic part P sucked by the suction nozzle 51 is detected by a recognition camera 53. Subsequently, the suction nozzle 51 is displaced to a position confronting a mounting position of the electronic part P on a circuit board B. After inaccurate positioning of the electronic part P has been corrected, the electronic part P is mounted at a predetermined position on the circuit board B.

However, in the known parts mounting apparatus referred to above, the suction nozzle 51 is accurately positioned at the recognition the position in the course of displacement of the suction nozzle 51 towards the circuit board B after the electronic part P has been sucked by the suction nozzle 51. Then, after position of the electronic part P relative to the suction nozzle 51 has been recognized, the suction nozzle 51 is again displaced. Therefore, the known parts mounting apparatus has a drawback that the cycle time for mounting one electronic part P becomes long, thereby resulting in reduction of mounting efficiency.

Thus, the assignee of the present inventors proposed earlier an electronic parts mounting apparatus which includes a suction nozzle made of light transmitting material and a recognition means for recognizing the position, shape, etc. of an electronic part sucked by the suction nozzle. In this prior art electronic parts mounting apparatus, space arround the suction nozzle is required to be formed into a light transmitting suction chamber such that not only the electronic part vacuum-sucked by the suction nozzle but also the electronic part as a whole can be recognized. To this end, space arround the suction nozzle is closed by a light transmitting plate spaced a proper distance from the suction nozzle such that the suction chamber is defined. However, since the suction nozzle is detachably mounted on a mounting head in order to make it possible to wash the suction nozzle, air leakage at the mounting portion between the suction nozzle and the mounting head is large, so that it is difficult to increase the degree of vacuum of the suction chamber and thus, it is difficult to pick up a heavy electronic part.

Furthermore, in this prior art electronic parts mounting apparatus, since suction and cancellation of suction are required to be repeated at high speed, the volume of the suction chamber should be made small. Hence, the distance between the suction nozzle and the light transmitting plate becomes short and thus, dust, etc. mixed into the suction air adhere to the suction nozzle as well as the light transmitting plate. Accordingly, both the suction nozzle and the light transmitting plate are detachably mounted so they can be washed easily. As a result, since it becomes more difficult to increase the degree of vacuum of the suction chamber and the mounting construction of the suction nozzle becomes complicated, the prior art electronic parts mounting apparatus has disadvantages such that positioning accuracy of the suction nozzle is reduced and washing of the suction nozzle and the light transmitting plate becomes troublesome.

SUMMARY OF THE INVENTION

Accordingly, an essential object of the present invention is to provide, with a view to eliminating the inconveniences inherent in the conventional parts mounting apparatuses, a parts mounting apparatus in which the degree of vacuum of a suction chamber can be increased, positioning accuracy of the suction nozzle is improved and a washing operation of the suction nozzle can be performed easily and efficiently.

In order to accomplish this object of the present invention, a parts mounting apparatus embodying the present invention is characterized in that a suction nozzle portion includes a suction nozzle made of light transmitting material, a light transmitting plate disposed so as to be spaced a proper distance from the suction nozzle and a suction cylinder defining a suction chamber together with the suction nozzle and the light transmitting plate such that the suction nozzle, the light transmitting plate and the suction cylinder are provided integrally with each other.

It is desirable that a support cylinder for receiving the suction cylinder of the suction nozzle portion is provided in a mounting head and is formed with a vacuum suction passage, while an opening communicating the suction chamber with the vacuum suction passage is formed in the suction cylinder. The above mentioned opening may be replaced by first and second openings flush with the suction nozzle and the light transmitting plate, respectively. Furthermore, a retaining means for detachably fixing, by a single touch, the suction nozzle portion to the mounting head is provided.

In accordance with the present invention, since the suction nozzle, the light transmitting plate and the suction cylinder, which define the suction chamber, are provided integrally with each other, the degree of vacuum of the suction chamber can be improved. Since mounting of the suction nozzle and the light transmitting plate can be performed by merely mounting the suction nozzle portion on the mounting head, the mounting construction of the suction nozzle and the light transmitting plate is simplified, so that positioning accuracy of the suction nozzle is improved and washing of the suction nozzle and the light transmitting plate can be performed at the same time.

Meanwhile, since the suction cylinder of the suction nozzle portion is fitted into the support cylinder of the mounting head such that the suction chamber is communicated with the vacuum suction passage through an opening in the suction cylinder, not only can mounting of the suction nozzle portion and connection of the suction nozzle portion with a vacuum suction means can be performed simultaneously and easily but the suction nozzle portion can be sealed easily. If first and second openings flush with the suction nozzle and the light transmitting plate, respectively, are formed on the suction cylinder, the suction chamber can be filled with washing liquid rapidly, and thus the suction nozzle and the light transmitting plate can be washed efficiently.

Furthermore, if the suction nozzle portion is detachably mounted on the mounting head through a single touch of a retaining member, it becomes possible to carry out changing of the parts promptly by providing various suction nozzle portions for different kinds of the parts, respectively. In addition, by preparing spare suction nozzle portions, mounting operation can be continued substantially without interruption of the operation of the apparatus even at the time of washing of the suction nozzle portion.

BRIEF DESCRIPTION OF THE DRAWINGS

This object and features of the present invention will become apparent from the following description of a preferred embodiment thereof and with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
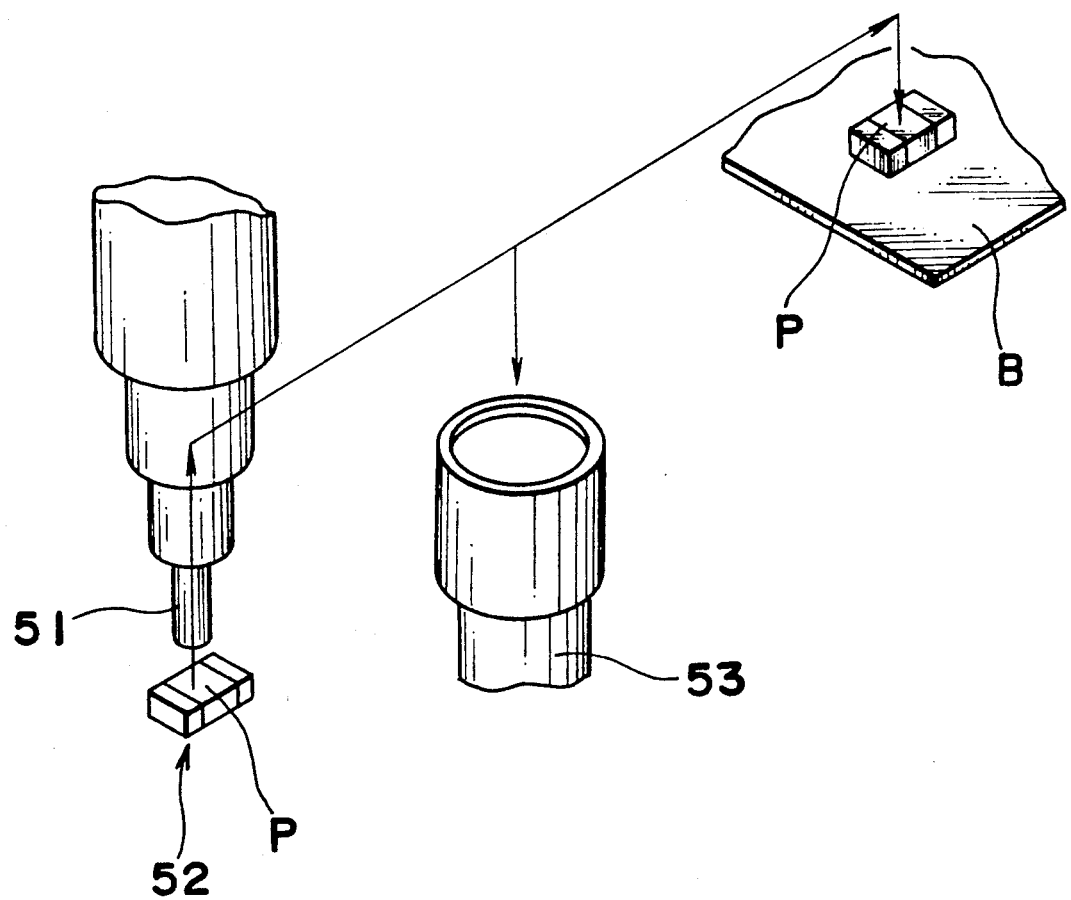
FIG. 1 is a perspective view schematically showing operation of a prior art parts mounting apparatus (already referred to)
Figure 2:
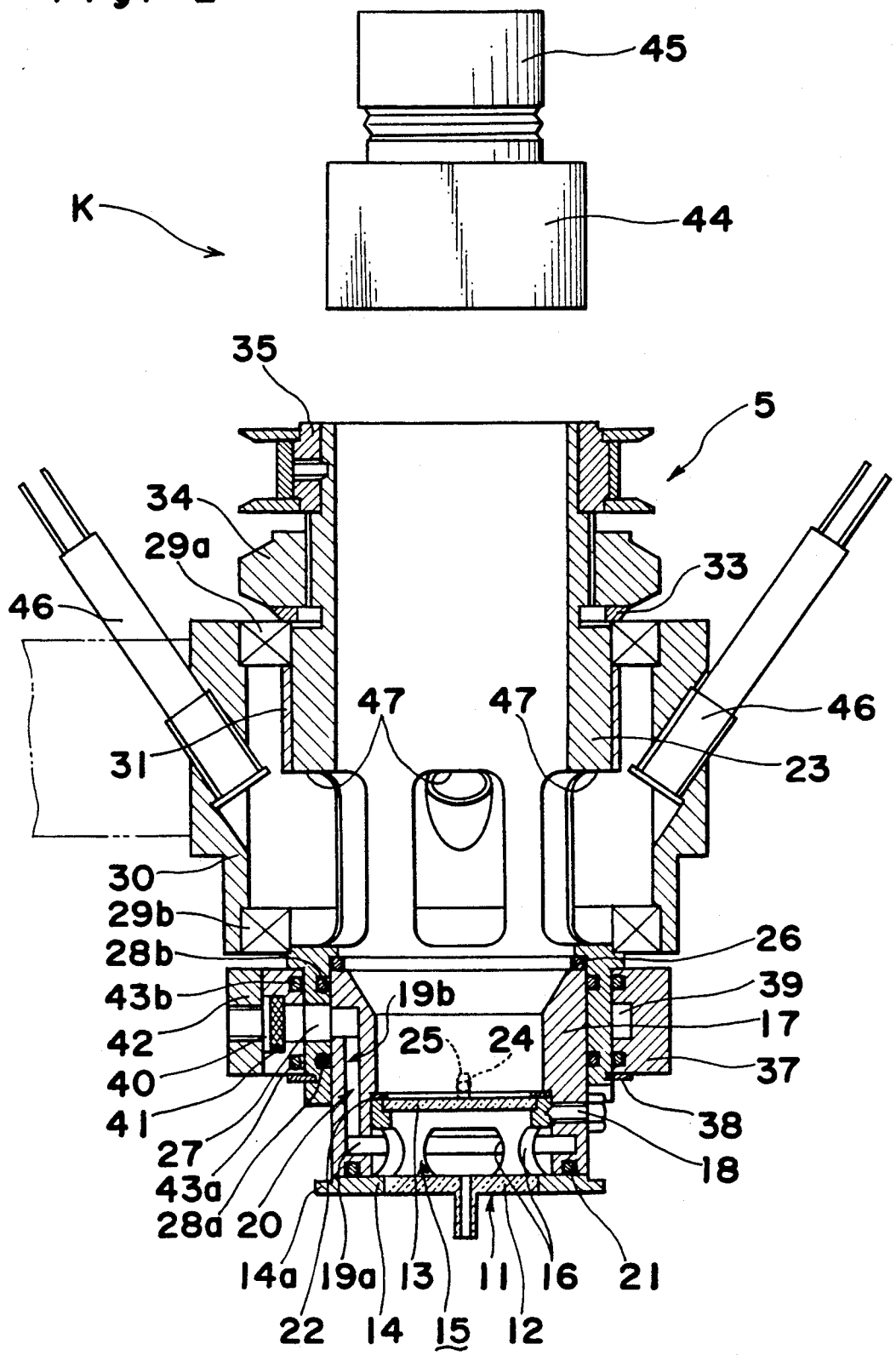
FIG. 2 is a sectional view of a mounting head of a parts mounting apparatus according to one embodiment of the present invention.
Figure 3:
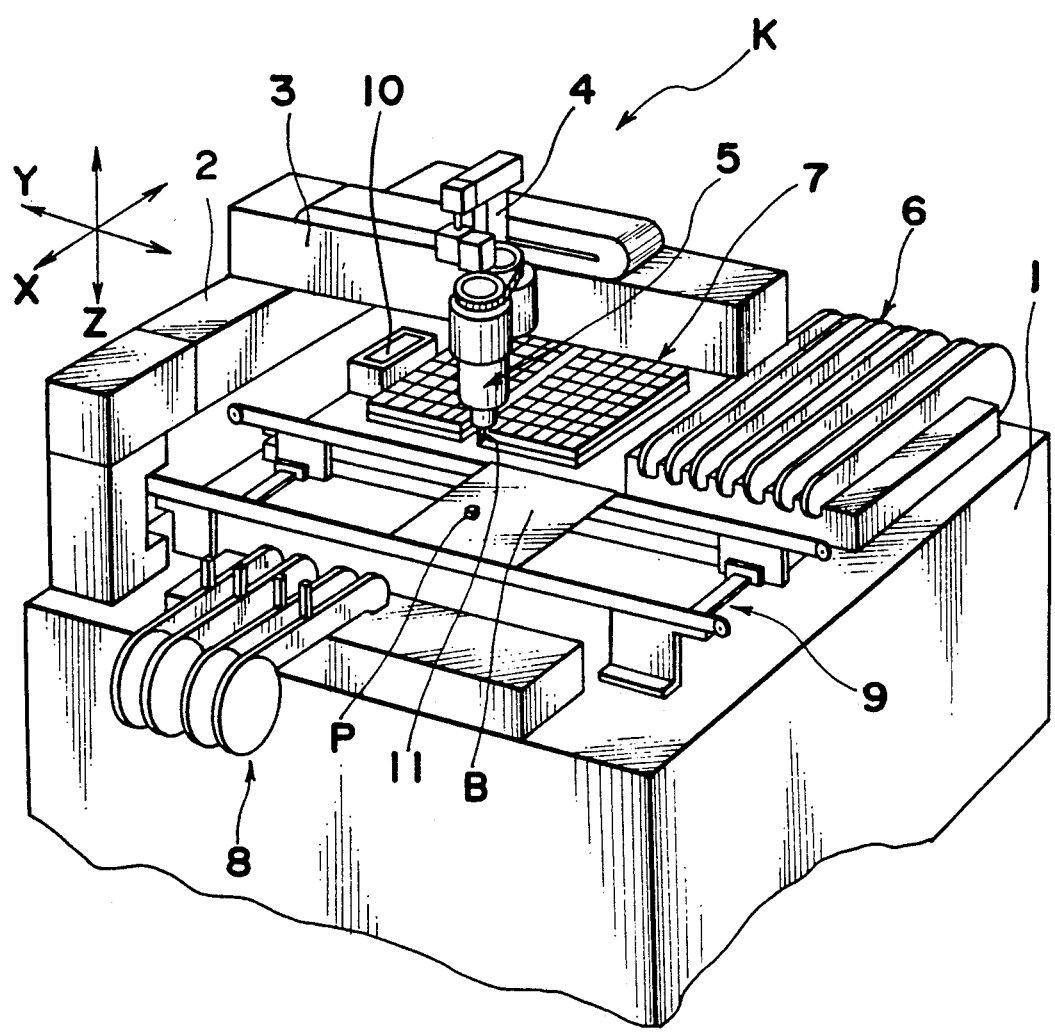
FIG. 3 is a schematic perspective view of the parts mounting apparatus for the mounting head of FIG. 2.
Figure 4:
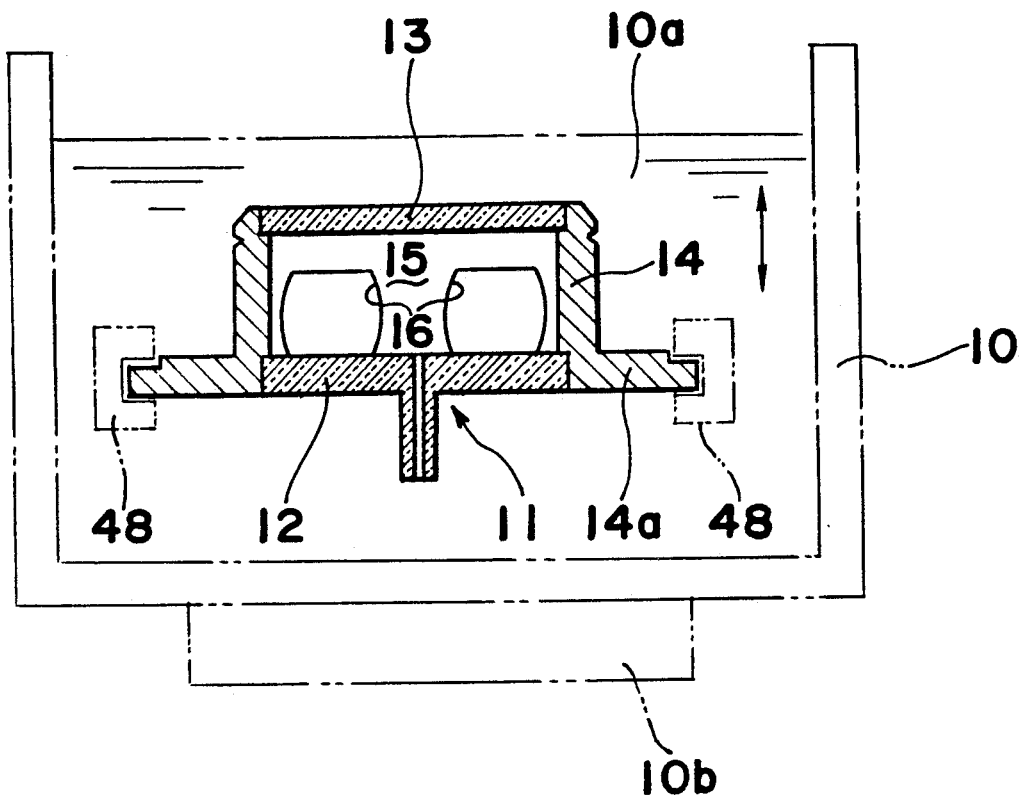
FIG. 4 is a sectional view of a suction nozzle portion of the parts, mounting apparatus of FIG. 2.

Referring now to the drawings, there is shown in FIGS. 2 to 4, a parts mounting apparatus K according one embodiment of the present invention. In FIG. 3, the apparatus K includes an apparatus frame 1. A Y-axis table 2 movable in the direction of the arrow Y is provided at one side of an upper face of the apparatus frame 1 and an X-axis table 3 movable in the direction of the arrow X is provided on the Y-axis table 2. A Z-axis table 4 is movable along the X-axis table 3 in the direction of the arrow Y and a mounting head 5 including a suction nozzle portion 11 is movably mounted on the Z-axis table 4 so as to be moved in the direction of the arrow Z.

Meanwhile, a parts feeding means 6 employing an assembly of tapelike parts and a parts feeding means 7 in which parts are accommodated in a tray are provided at a rear portion of the upper face of the apparatus frame 1. A transport and positioning means 9 for transporting and positioning a circuit board B on which an electronic part P is mounted is provided at a front portion of the upper face of the apparatus frame 1. A parts feeding means 8 for feeding special parts is provided at the other side of the upper face of the apparatus frame 1. It is so arranged that the suction nozzle portion 11 can be displaced between a sucking position for picking up the electronic part P at each of the parts feeding means and an arbitrary mounting position for mounting the electronic part P on the circuit board B. An ultrasonic washing reservoir 10 acting as a washing means is provided at a side of the parts feeding means 7 and is positioned in the movable range of movement of the suction nozzle portion 11.

In FIG. 2, the suction nozzle portion 11 is constituted by a suction nozzle 12 made of light transmitting material, a light transmitting plate 13 and a suction cylinder 14. The light transmitting plate 13 is provided above the suction nozzle 12 and spaced a proper distance from the suction nozzle 12. The suction nozzle 12 and the light transmitting plate 13 are, respectively, integrally attached to lower and upper end portions of the suction cylinder 14. A suction chamber 15 is defined by the suction nozzle 12, the light transmitting plate 13 and the suction cylinder 14. A plurality of suction openings 16 are formed in a side wall of the suction cylinder 14 at a predetermined circumferential interval so as to be flush with an upper face of the suction nozzle 12. A flange 14a is provided at an outer periphery of a lower end of the suction cylinder 14. The suction cylinder 14 of the suction nozzle portion 11 is fitted into a support cylinder 17 and is retained by an elastic retaining member 18 such that the suction nozzle portion 11 can be replaced merely through a single touch operation of the retaining member 18 with a different nozzle portion 11 in accordance with size of the electronic part P to be sucked.

An annular groove 19a is formed at an inner periphery of a lower portion of the support cylinder 17 so as to confront the suction openings 16 and a passage 19b communicating with the annular groove 19a opens out of an outer peripheral surface of an upper portion of the support cylinder 17. A vacuum suction passage 20 is formed by the annular groove 19a and the passage 19b. A sealing member 21 is inserted between the flange 14a of the suction cylinder 14 and a lower end face of the support cylinder 17, while a sealing member 22 is inserted between an upper end of the suction cylinder 14 and a step portion formed at an inner periphery of the support cylinder 17.

The support cylinder 17 is fitted into an inner periphery of a lower end portion of a rotary cylinder 23 and is slightly vertically movably supported through engagement of a pin 24 with an elongated opening 25. An elastic member 26 provided for shock absorbing purposes is inserted between an upper end face of the support cylinder 17 and a step portion formed at an inner periphery of the rotary cylinder 23. In addition, a through-hole 27 is formed at a lower end portion of the rotary cylinder 23 so as to confront an opening of the passage 19b and sealing members 28a and 28b are provided at an inner periphery of lower and upper portions of the rotary cylinder 23, respectively.

The rotary cylinder 23 is rotatably supported, through bearings 29a and 29b provided at an intermediate portion of the rotary cylinder 23 and spaced a proper distance from each other, by a movable member 30 which is vertically movable along the Z-axis table 4. A spacer 31 is inserted between inner rings of the bearings 29a and 29b. A nut 34 is threadedly engaged with a outer periphery of the rotary cylinder 23 so as to axially depress and secure the bearings 29a and 29b through a collar 33. A pulley 35 is mounted on the outer periphery of an upper end of the rotary cylinder 23 and is driven by a driving motor (not shown) so as to rotate the suction nozzle portion 11 to an arbitrary angular orientation.

A suction head 37 is fitted around the outer periphery of the lower end of the rotary cylinder 23 and is supported by a retaining ring 38 such that the rotary cylinder 23 and the suction head 37 are moved relative to each other. An annular groove 39 is formed at an inner periphery of the suction head 37 so as to confront the through-hole 27. Furthermore, a recess 40 is formed at an outer peripheral surface of the suction head 37 so as to be communicated with the annular groove 39 and a filter 41 is provided in the recess 40. A coupling member 42 of a vacuum suction means (not shown) is mounted on an outer periphery of the suction head 37 so as to confront the recess 40. Sealing members 43a and 43b are provided at an inner periphery of the suction head 37.

A recognition camera 45 is provided above the rotary cylinder 23 coaxially with the rotary cylinder 23. An optical lens system 44 is mounted on a lower portion of the recognition camera 45. In addition, a plurality of illuminating lamps 46 for irradiating illuminating light to the suction nozzle portion 11 are provided around the movable member 30 at a proper interval. A plurality of windows 47 for transmitting this illuminating light therethrough are formed in the rotary cylinder 23 and the spacer 31.

As shown in FIG. 4, washing liquid 10a is accommodated in the ultrasonic washing reservoir 10 and an ultrasonic oscillator 10b is mounted on a lower face of a bottom wall of the reservoir 10. A washing manipulator 48 is vertically movably provided in the reservoir 10. A washing manipulator 48 is engageable with the flange 14a of the suction nozzle portion 11 so as to hold the suction nozzle portion 11 and is vertically movable between a lower position where the suction nozzle portion 11 is dipped in the washing liquid 10a and an upper position where the suction nozzle portion 11 is pulled upwardly out of the washing liquid 10a.

Hereinbelow, operation of the parts mounting apparatus K is described. Initially, the suction nozzle portion 11 is displaced to a position above and confronting a picking up position for sucking the electronic part P. Then, shape of the electronic part P disposed at the sucking position is recognized by the recognition camera 45 through the suction nozzle 12 made of light transmitting material and the light transmitting plate 13. In the case where the electronic part P has an improper shape, suction of the electronic part P is not performed and the next electronic part P is fed to the sucking position and the shape of that electronic part P is recognized by the recognition camera 45. When the shape of the electronic part P is proper, the movable member 30 is lowered so that the electronic part P is sucked by the suction nozzle portion 11. After the suction nozzle portion 11 has been lifted to its original position, the X-axis table 3 and the Y-axis table 2 are actuated such that the electronic part P held by the suction nozzle portion 11 is displaced to a position above its predetermined mounting position o the circuit board B. At this time, position of the electronic part P sucked by the suction nozzle portion 11 is accurately recognized by the recognition camera 45, whereby amounts of deviation of the electronic part P from its predetermined sucking position in the directions of the arrows X and Y and an angle $\theta$ of inclination relative to its predetermined mounting orientation are detected and corrected through correction of amounts of travel of the X-axis table 3 and the Y-axis table 2 and through rotation of the pulley 35, respectively. Thereafter, the movable member 30 is lowered and air is introduced into the suction chamber 15 so as to cancel suction such that the electronic part P is accurately mounted at the predetermined mounting position of the circuit board B. By repeating the above described operation, the proper electronic parts P are, respectively, efficiently mounted at the mounting positions on the circuit board B sequentially.

Meanwhile, if dust, etc. are carried into the suction chamber 15 together with suction air at the time of suction of the electronic part P and adhere to the suction nozzle 12 or the light transmitting plate 13, dust, etc. are detected by the recognition camera 45. To this end, and operating program is formulated such that dirt on the suction nozzle 12 and the light transmitting plate 13 is detected at each mounting operation or at an interval of a proper number of mounting operations by the recognition camera 45. In order to detect dirt on the suction nozzle 12 and the light transmitting plate 13, a method, for example, can be employed in which the suction nozzle portion 11 is placed on an illuminator or a white pattern and is viewed by the recognition camera 45 and a decision that the suction nozzle 12 or the light transmitting plate 13 is dirty is made if the number of picture elements having a black level caused by dirt has exceeded a predetermined value.

When dirt on the suction nozzle 12 or the light transmitting plate 13 has been detected as described above, a cleaning command is issued and thus, the mounting head 5 is displaced towards the ultrasonic washing reservoir 10. Subsequently, the flange 14a of the suction cylinder 14 is engaged with the washing manipulator 48 and then, the movable member 30 is raised while the suction nozzle portion 11 is held by the washing manipulator 48. Thereafter, in place of the suction nozzle portion 11 held by the washing manipulator 48, another suction nozzle portion 11 is mounted on the mounting head 5 so as to start a mounting operation.

On the other hand, the suction nozzle portion 11 held by the washing manipulator 48 is dipped in the washing liquid 10a upon descent of the washing manipulator 48. Therefore, the washing liquid 10a enters the suction chamber 15 from the suction opening 16 and thus, the suction nozzle 12 and the light transmitting plate 13 are subjected to ultrasonic washing. After the suction nozzle 12 and the light transmitting plate 13 have been washed for a predetermined time period, the washing manipulator 48 is raised out of the washing liquid 10a and the suction nozzle portion 11 is dried by an appropriate drying means, etc. After completion of washing and drying of the suction nozzle portion 11, the suction nozzle portion 11 is set in a waiting location. Upon passage of a proper duration at the waiting location, the suction nozzle portion 11 is mounted on the mounting head 5 by procedures opposite to those described above so as to resume the mounting operation of the electronic part P.

In the above described embodiment, the ultrasonic washing reservoir is employed as a cleaning means but can be replaced by other cleaning means.

Figure 5:
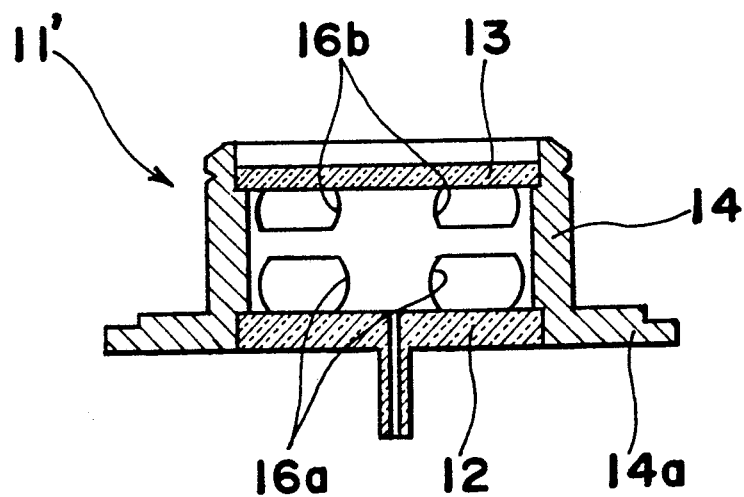
FIG. 5 is a view similar to FIG. 4, particularly showing a modification thereof.

In the above described embodiment, only the suction openings 16 flush with the suction nozzle 12 are formed in the suction cylinder 14 but this can be modified in various ways. For example, FIG. 5 shows a suction nozzle portion 11' which is a modification of the suction nozzle portion 11. In the suction nozzle portion 11', a plurality of first openings 16a for vacuum suction and a plurality of second openings 16b acting as air outlets are formed in the suction cylinder 14 so as to be flush with the upper face of the suction nozzle 12 and with a lower face of the light transmitting plate 13, respectively. Since the washing liquid 10a is easily filled in the suction chamber 15 through the second openings 16b, the suction nozzle portion 11' can be washed more effectively than the suction nozzle portion 11.

As is clear from the foregoing description, in accordance with the present invention, since the suction nozzle, the light transmitting plate and the suction cylinder, which define the suction chamber, are integrally provided as the suction nozzle portion, the degree of vacuum of the suction chamber can be improved and thus, even a heavy part can be positively sucked by the suction nozzle portion. Further, since the suction nozzle and the light transmitting plate can be mounted on the mounting head by mounting the suction nozzle portion, construction of the mounting means for the suction nozzle and the light transmitting plate is simplified, thereby resulting in improvement of positioning accuracy of the suction nozzle. Furthermore, washing of the suction nozzle and the light transmitting plate can be performed easily.

Further, since the suction cylinder of the suction nozzle portion is fitted into the support cylinder of the mounting head such that the suction chamber is communicated with the vacuum suction passage through the openings of the suction cylinder, not only can mounting of the suction nozzle portion and connection of the suction nozzle portion with the vacuum suction means be performed simultaneously and easily but the suction nozzle portion can be sealed easily.

Furthermore, if the first and second openings are, respectively, formed in the suction cylinder so as to be flush with the suction nozzle and the light transmitting plate, the suction chamber can be rapidly filled with the washing liquid and thus, the suction nozzle and the light transmitting plate can be washed efficiently.

Moreover, since the suction nozzle portion can be mounted on and removed from the mounting head merely through a single movement of the retaining member, it becomes possible to carry out a change of the parts promptly and the mounting operation can be continued substantially without interruption during the time of washing of the suction nozzle portion.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. In a parts mounting apparatus having means for picking up a part by a mounting head and transporting the part to mount the part at a predetermined position, the combination comprising:
   a suction pick-up nozzle means for mounting on said mounting head including a suction nozzle, a light transmitting plate spaced from said suction nozzle to leave a space therebetween, and a suction cylinder integrally connected between said suction nozzle and said light transmitting plate and surrounding said space to define a suction chamber therein;
   said suction nozzle being made of light transmitting material, and
   a part shape and position recognition camera positioned outwardly of said light transmitting plate and directed toward said plate and through said suction chamber and suction nozzle for viewing parts picked up by said suction nozzle and recognizing their shape and their position on said suction nozzle and for supplying a control signal to said part picking up and transporting means.

2. The combination as claimed in claim 1 further comprising a support cylinder for mounting on said mounting head and for receiving said suction pick-up nozzle means therein, said support cylinder having a vacuum suction passage opening thereinto, and said suction cylinder having an opening therethrough which communicates said suction chamber with said vacuum suction passage.

3. The combination as claimed in claim 2 wherein said opening is constituted by a first part having an edge flush with said suction nozzle and a second part having an edge flush with said light transmitting plate.

4. The combination as claimed in claim 2 further comprising a retaining means on said suction pick-up nozzle means and said support cylinder for detachably mounting said suction pick-up nozzle means on said mounting head and for freeing said suction pick-up nozzle means by a single movement.

5. The combination as claimed in claim 1 further comprising a retaining means on said suction pick-up nozzle means and said mounting head for detachably mounting said suction pick-up nozzle means on said mounting head and for freeing said suction pick-up nozzle means by a single movement.

* * * * *